United States Patent [19]

Ikeno et al.

[11] Patent Number: 5,086,147

[45] Date of Patent: Feb. 4, 1992

[54] ORGANOPOLYSILOXANE COMPOSITION

[75] Inventors: Masayuki Ikeno; Hironao Fujiki, both of Gunma, Japan

[73] Assignee: Shin-Etsu Chemical Co., Ltd., Tokyo, Japan

[21] Appl. No.: 556,723

[22] Filed: Jul. 25, 1990

[30] Foreign Application Priority Data

Jul. 25, 1989 [JP] Japan ................... 1-192370

[51] Int. Cl.$^5$ ............................................. C08G 7/06
[52] U.S. Cl. ........................................ 528/15; 528/31; 528/32
[58] Field of Search .......................... 528/15, 31, 32

[56] References Cited

U.S. PATENT DOCUMENTS

| 4,042,643 | 8/1977 | Creasy et al. | 528/15 |
| 4,772,515 | 9/1988 | Hara et al. | 528/15 |
| 4,777,063 | 10/1988 | Dubrow et al. | 528/31 |
| 4,849,491 | 7/1989 | Ogawa et al. | 528/31 |

Primary Examiner—Melvyn I. Marquis
Assistant Examiner—Margaret W. Glass
Attorney, Agent, or Firm—Millen, White & Zelano

[57] ABSTRACT

An organopolysiloxane gel composition improved upon discoloration due to thermal deterioration, which comprises (A) 100 pts. wt. of an organopolysiloxane containing alkenyl groups in side chains, (B) a specified amount of an organohydrogenpolysiloxane containing on the statistical average one terminal hydrogen and one terminal alkenyl group, and (C) a catalytic amount of addition reaction catalyst.

14 Claims, No Drawings

ORGANOPOLYSILOXANE COMPOSITION

FIELD OF THE INVENTION

This invention relates to an organopolysiloxane composition and, more particularly, to an organopolysiloxane gel composition which has improved resistance to discoloration due to thermal deterioration.

BACKGROUND OF THE INVENTION

Cured silicone rubber gels (abbreviated as silicone gels, hereinafter) are used for electric or electronic potting or sealing, and as covering material for protection of control circuit elements, especially power transistor, IC, condenser and the like, against thermal and mechanical damages by taking advantage of their excellent electric insulation, stability to electricity and flexibility.

Various methods of preparing such silicone gels have been proposed. For instance, in the methods disclosed in Japanese Patent Kokoku (examined Japanese patent publications) Nos. 55-41705 and 55-38992 the silicone rubber is designed so that the ratio of hydrogen atoms attached directly to a silicon atom to vinyl groups attached directly to a silicon atom is one or less.

However, compositions which can be converted to such silicone gels by curing, and the silicone gels obtained suffer from a defect in that they are discolored through thermal deterioration.

Such a defect, though harmless in cases where electric insulation, electric characteristics, viscosity and the like are regarded as the significant properties because these properties of silicone gels undergo no change as a result of the discoloration, discoloration is a serious problem when optical characteristics are required of the silicone gels.

The discoloration of silicone gels which has accompanied thermal deterioration is known to be correlated to the amount of platinum used as the addition reaction catalyst, and the ratio of $\equiv$SiH to $\equiv$SiCH$=$CH$_2$ groups. Specifically, the extent of discoloration becomes less the smaller the amount of platinum used, and the higher the $\equiv$SiH/$\equiv$SiCH$=$CH$_2$ ratio. Therefore, the above-described discoloration resulting from thermal deterioration would seem to be preventable by reducing the amount of platinum used. However, a reduction in the amount of platinum used tends to cause curing troubles. When the factor of a high $\equiv$SiH/$\equiv$SiCH$=$CH$_2$ ratio is added in particular, there is produced an additional a change in hardness and a foaming phenomenon are apt to occur as a result of thermal deterioration.

With the intention of bringing about an improvement in resistance to discoloration accompanying thermal deterioration, there has been proposed the combined use of polysiloxane containing at least two vinyl groups and one hydroxyl group attached directly to silicon atoms in the same molecule and a silane containing one epoxy group and one alkoxy group per one molecule. See examined Japanese Patent Kokoku No. 59-35932. In addition, Japanese Patent Kokai (unexamined published Japanese patent application) No. 62-39660 discloses a composition comprising an organopolysiloxane containing vinyl groups attached directly to silicon atoms which are numbered by 0.1 to 2.0 on the average per one molecule and a hydrogensiloxane represented by the formula, $R^4Si(OSiR^5{}_2H)_3$, (wherein $R^4$ represents an alkyl or phenyl group, and $R^5$ represents an alkyl group). However, the silicone gels prepared from those compositions have the defect that the light transmittances at wavelengths shorter than 500 nm are lowered to 90% or below after they have suffered thermal deterioration, which limits the area of optical utilization.

As the result of concentrating on finding a solution to the problems as described above, it has now been found that the use of an organohydrogenpolysiloxane containing alkenyl groups and hydrogen atoms attached to silicon atoms at the molecular chain terminals is particularly effective, thus achieving this invention.

SUMMARY OF THE INVENTION

An object of this invention is to provide an organopolysiloxane gel composition which has improved resistance to discoloration due to thermal deterioration.

The above-described object of this invention is attained with an organopolysiloxane gel composition comprising (A) 100 parts by weight of an organopolysiloxane represented by the general formula (1)

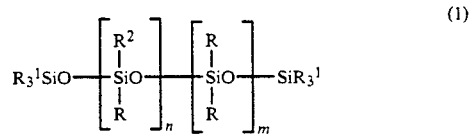

wherein R represents a substituted or unsubstituted monovalent hydrocarbon residue, other than an aliphatic unsaturated group; $R^1$ represents a substituted or unsubstituted monovalent hydrocarbon residue; $R^2$ represents an alkenyl group; and n and m each represents a positive integer:

(B) an organohydrogenpolysiloxane represented by the general formula (2)

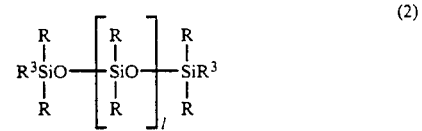

wherein R has the same meaning as R in component (A); $R^3$ is an alkenyl group on hydrogen atom, provided that the number of alkenyl groups and hydrogen atoms in a molecule are each one, on a statistical average; and l represents a positive integer, in an amount such that the ratio of hydrogen atoms attached to silicon atoms therein to alkenyl groups attached to silicon atoms in the component (A) is from 0.1 to 4; and (C) a catalytic amount of an addition reaction catalyst.

DETAILED DESCRIPTION OF THE INVENTION

In the organopolysioxane used as component (A) of this invention, which is represented by the general formula (1), above, Specific examples of R, which represents a substituted or unsubstituted monovalent hydrocarbon residue of 1 to 10 carbon atoms, preferably 1 to 8 carbon atoms, except aliphatic unsaturated groups, are alkyl groups such as methyl, ethyl, propyl, isopropyl, butyl, octyl, etc., cycloalkyl groups such as cyclopentyl, cyclohexyl, cyclobutyl, etc., aryl groups such as phenyl, naphthyl, tolyl, xylyl, etc., aralkyl groups such as benzyl, phenylethyl, phenylpropyl, etc., halogen derivatives of the above-cited groups such as chloromethyl, trifluoromethyl, trifluoropropyl, chlorophenyl, difluorophenyl, etc., and cyanoalkyl groups such as β-cyanoethyl, γ-cyanopropyl, β-cyanopropyl, etc.

Among these groups, methyl is preferred because of ease of synthesis and the thermal resistance of the silicone gel, which prepared therefrom.

Specific examples of $R^1$ in the general formula (1), which is a substituted or unsubstitued monovalent hydrocarbon residue with 1 to 10 carbon atoms, preferably 1 to 8 carbon atoms, are alkyl groups such as methyl, ethyl, propyl, isopropyl, butyl, octyl, etc., alkenyl groups such as vinyl, allyl, 1-butenyl, etc., cycloalkyl groups such as cyclopentyl, cyclohexyl, cyclobutyl, etc., aryl groups such as phenyl, naphthyl, tolyl, xylyl, etc., aralkyl groups such as benzyl, phenylethyl, phenylpropyl, etc., halogenated derivatives of the above-cited groups such as chloromethyl, trifluoromethyl, trifluoropropyl, chlorophenyl, dibromophenyl, tetrachlorophenyl, difluorophenyl, etc., and cyanoalkyl groups such as β-cyanoethyl, γ-cyanopropyl, β-cyanopropyl, etc.

$R^2$ is an alkenyl group, which includes those containing 2 to 8 carbon atoms, preferably 2 to 4 carbon atoms, e.g., vinyl, allyl, 1-butenyl, etc. Among them, vinyl group is particularly favored from the standpoint of ease of synthesis.

In formula (1), n and m are each a positive integer, and the sum of them (n+m) should be such that component (A) has a viscosity of from 50 to 100,000 cp, preferably from 500 to 5,000 cp, at 25° C.

When the viscosity is below 50 cp, the composition of the present invention is liable to flow, whereas when it is exceeds 100,000 cp the composition poor fluidity.

Though it is not always necessary for the organopolysiloxane of the above-described component (A) to have alkenyl which are attached to silicon atoms at the both ends of the molecule, to prevent discoloration of the organopolysiloxane from occurring due to thermal deterioration, on the average at least one polymer unit thereof which contains an alkenyl group in a side chain and is represented by the formula,

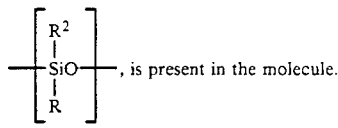, is present in the molecule.

When the statistical average number of side-chain alkenyl groups amounts to less than one per molecule, the resulting composition may not harden satisfactorily, so that it cannot assume a gel form, and it may be subject to discoloration through thermal deterioration.

In the organohydrogenpolysiloxane used as the component (B) of this invention, which is represented by formula (2), when, $R^3$ is an alkenyl group, examples of an such an alkenyl group are those containing 2 to 8 carbon atoms, preferably 2 to 4 carbon atoms, such as vinyl, allyl, 1-butenyl, etc. Among them, the vinyl group is particularly preferred with respect each of synthesis.

In component (B), the statistical average of alkenyl groups attached to a terminal silicon atom and of hydrogen atoms attached to a terminal silicon atom are each per one molecule. This component not only acts as a chain extending agent, but also has such the function of preventing the discoloration from occurring as high temperatures, which is a characteristic of this invention. Component (B) is present in an amount such that the ratio of the hydrogen atoms attached to silicon atoms in component (B) is from 0.1 to 4.0, preferably from 0.5 to 1.5, relative to the alkenyl groups attached to silicon atoms in component (A).

When the above ratio of hydrogen atoms is less than 0.1, the cross-linking reaction does not proceed adequately, so the silicone gel which is obtained is so soft that it still has flowability. On the other hand, when ratio of hydrogen atoms is more than 4.0, the silicone gel obtained becomes harder and harder with the lapse of time, and further there is the possibility of foaming.

Component (B) is not particularly limited with respect to viscosity, but it is desirable from an economical production point of view that the viscosity should be below 1,000 cp.

The catalyst used as component (C) of this invention is used to promote the hydrosilylation reaction, and can be chosen properly from known ones, e.g., chloroplatinic acid, and an alcohol-modified solution of chloroplatinic acid, coordinate compounds of chloroplatinic acid and olefins or vinylsiloxanes, tetrakis(triphenylphosphine) palladium, chlorotris(triphenylphosphine)rhodium, and so on. Among them, the catalysts the platinum type are used to particular advantage.

A catalytic amount of above-described catalyst is used, which in general, is 0.1 to 100 ppm based on the total amount of the component (A) and the component (B).

In addition to the above-described components (A) to (C), any of various other components can be present in the composition of this invention, if needed. For instance, another silicone oil such as a dimethylpolysiloxane, or raw rubber may be added, in such an amount as not to interfere with the effect of this invention for the purpose of controlling or modifying the flowability of the composition and the hardness of the cured composition. Also, a known reaction retarder and the like may be added.

This invention will now be illustrated in more detail by reference to the following examples. However, the invention should not be contstrued as being limited to these examples. In addition, all viscosity values in the examples were measures at 25° C.

EXAMPLES

The ingredients illustrated below were mixed homogeneously in compounding ratios (by weight) shown in Table 1 to prepare compositions from No. 1 to No. 7. Of these compositions No. 1 to No. 3 were prepared in accordance with this invention, whereas No. 4 to No. 7 were prepared for comparison.

Organopolysiloxane I

Dimethylpolysiloxane containing side-chain vinyl groups, represented by the following average constitutional formula,

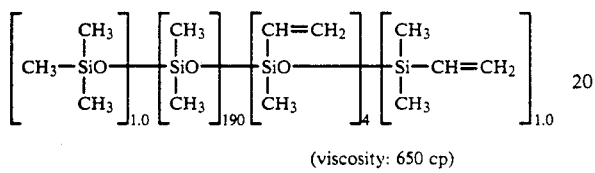

(viscosity: 700 cp)

Organopolysiloxane II

Dimethylpolysiloxane containing vinyl groups, represented by the following average constitutional formula,

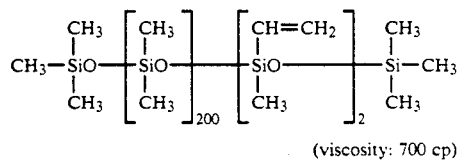

(viscosity: 650 cp)

Organopolysiloxane III

Dimethylpolysiloxane containing side-chain vinyl groups, represented by the following average constitutional formula,

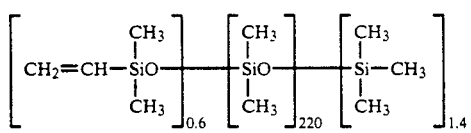

(viscosity: 700 cp)

Organopolysiloxane IV

Dimethylpolysiloxane containing vinyl group, represented by the following average constitutional formula,

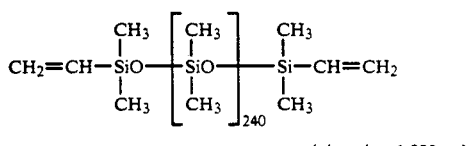

(viscosity: 800 cp)

Organopolysiloxane V

Dimethylpolysiloxane containing vinyl groups on both molecular ends, represented by the following average constitutional formula,

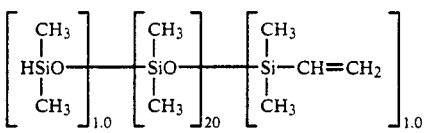

(viscosity: 1,000 cp)

Organopolysiloxane VI

Methylhydrogenpolysiloxane containing vinyl group, represented by the average constitutional formula,

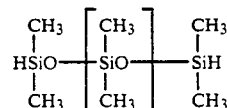

(viscosity: 18 cp)

Organopolysiloxane VII

Methylhydrogenpolysiloxane represented by the average constitutional formula,

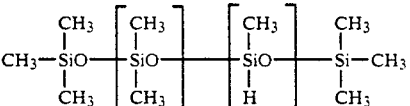

(viscosity: 18 cp)

Organopolysiloxane VIII

Methylhydrogenpolysiloxane represented by the average constitutional formula,

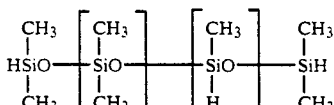

(viscosity: 100 cp)

Organopolysiloxane IX

Methylhydrogenpolysiloxane represented by the average constitutional formula, (viscosity: 18 cp)

Catalyst

Compound obtained by heating a mixture of chloroplatinic acid with tetramethyldivinylsiloxane (platinum content: 1 wt %).

TABLE 1

| Composition | Invention | | | Comparison | | | |
|---|---|---|---|---|---|---|---|
| | No. 1 | No. 2 | No. 3 | No. 4 | No. 5 | No. 6 | No. 7 |
| Polysiloxane I | 100 | 100 | | | | | |
| Polysiloxane II | | | 100 | | | | |
| Polysiloxane III | | | | 100 | | | |
| Polysiloxane IV | | | | | 100 | 100 | |
| Polysiloxane V | | | | | | | 100 |
| Polysiloxane VI | 42 | 42 | 42.5 | | | | |
| Polysiloxane VII | | | | 6.5 | | | |

TABLE 1-continued

| Composition | Invention | | | Comparison | | | |
|---|---|---|---|---|---|---|---|
| | No. 1 | No. 2 | No. 3 | No. 4 | No. 5 | No. 6 | No. 7 |
| Polysiloxane VIII | | | | | 0.7 | 0.7 | |
| Polysiloxane IX | | | | | | | 2.1 |
| Catalyst | 0.07 | 0.14 | 0.07 | 0.05 | 0.05 | 0.10 | 0.05 |
| Platinum Content (ppm) | 5 | 10 | 5 | 5 | 5 | 10 | 5 |
| SiH/SiCH=CH$_2$ (by mole) | 0.4 | 0.4 | 1.0 | 0.6 | 1.0 | 1.0 | 0.55 |

Curing 7 was heated at 150° C. for one hour, and thereby underwent curing. As the result, every composition was converted to a gelled material which was examined for penetration degree with a ¼ inch consistency tester according to JIS (Japanese Industrial Standard Test Method) K2808 (which corresponds to ASTM D-1403) and for transmittance in the manner described below. The results obtained are shown in Table 2.

Transmittance Test

The gelled materials obtained from compositions No. 1 to No. 7, which had been obtained by curing, were placed in a hot-air circulation type oven for a period of 100 hours at a temperature of 150° C. to achieve a high temperature processing. The thus processed materials were examined for change in transmittance at 400 nm with the lapse of time.

TABLE 2

| Gelled Material | Invention | | | Comparison | | | |
|---|---|---|---|---|---|---|---|
| | No. 1 | No. 2 | No. 3 | No. 4 | No. 5 | No. 6 | No. 7 |
| Penetration Degree | 80 | 80 | 84 | 65 | 100 | 95 | 70 |
| Transmittance (%) * Before High Temperature Processing | 99 | 99 | 99 | 94 | 93 | 88 | 89 |
| After High Temperature Processing | 95 | 92 | 95 | 88 | 88 | 75 | 77 |

*: percentage based on the transmittance of water

The data shown in Table 2 substantiated the superiority of the organopolysiloxane gel compositions of this invention with respect to resistance against discoloration due to thermal deterioration, regardless of the amount of a platinum catalyst used and the molar ratio of ≡SiH to ≡SiCH=CH$_2$ groups.

What is claimed is:

1. An organopolysiloxane composition which comprises
   (A) 100 parts by weight of an organopolysiloxane represented by the formula

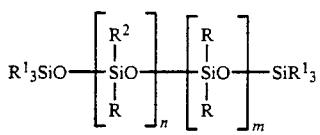

wherein R represents a substituted or unsubstituted monovalent hydrocarbon residue other than an aliphatic unsaturated group; R$^1$ represents a substituted or unsubstituted monovalent hydrocarbon residue; R$^2$ represents an alkenyl group; and n and m each represents a positive integer;

(B) an organohydrogenpolysiloxane represented by the general formula,

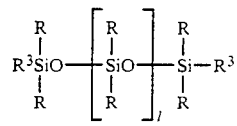

wherein R has the same meaning as R in the component (A); R$^3$ is selected from among alkenyl groups and hydrogen atom, with the proviso that the statistical average of alkenyl groups and hydrogen atoms per molecule each is one; and l represents a positive integer; in an amount such that the ratio of the hydrogen atoms thereof attached to the silicon atoms to the alkenyl groups attached to silicon atoms in the component (A) is from 0.1 to 4.0; and
   (C) a catalytic amount of an addition reaction catalyst.

2. The organopolysiloxane composition of claim 1, wherein the R in component (A) is a methyl group.

3. The organopolysiloxane composition of claim 1, wherein the R$^2$ in component (A) is a vinyl group.

4. The organopolysiloxane composition of claim 1, wherein a sum of (n+m) is a number such that component (A) has a viscosity of 50-100,000 cp at 25° C.

5. The organopolysiloxane composition of claim 4, wherein the sum of (n+m) is a number such that component (A) has a viscosity of 500 to 5,000 cp at 25° C.

6. The organopolysiloxane composition of claim 1, wherein R$^3$ in component (B) is a vinyl group or a hydrogen atom.

7. The organopolysiloxane composition of claim 1, wherein the component (B) content thereof is such that the ratio of the hydrogen atoms attached to silicon atoms in component (B) to the alkenyl groups attached to silicon atoms in component (A) is from 0.5 to 1.5.

8. The organopolysiloxane composition of claim 1, wherein the viscosity of component (B) is less than 1,000 cp at 25° C.

9. The organopolysiloxane composition of claim 1, wherein component (C) is a platinum type catalyst.

10. The organopolysiloxane composition of claim 1, wherein the catalyst content thereof is 0.1-100 ppm based on the total amount of component (A) and component (B).

11. A gel-like cured product obtained by curing the composition of claim 1.

12. The organopolysiloxane composition of claim 1, wherein the R in component (A) is a methyl group; wherein the R$^2$ in component (A) is a vinyl group; wherein the sum of (n+m) is a number such that component (A) has a viscosity of 50-100,000 cp at 25° C.; wherein R$^3$ in component (B) is a vinyl group or a hydrogen atom; wherein the component (B) content thereof is such that the ratio of the hydrogen atoms attached to silicon atoms in component (B) to the alkenyl groups attached to silicon atoms in component (A) is from 0.5 to 1.5; and wherein the viscosity of component (B) is less than 1,000 cp at 25° C.

13. The organopolysiloxane composition of claim 1, wherein component (C) is a platinum-based catalyst and the catalyst content of the composition is 0.1-100 ppm based on the total amount of component (A) and component (B).

14. The gel-like cured product obtained by curing the composition of claim 12.

* * * * *